(12) United States Patent
Prinz et al.

(10) Patent No.: US 8,951,605 B2
(45) Date of Patent: Feb. 10, 2015

(54) THIN FILM MEA STRUCTURES FOR FUEL CELL AND METHOD FOR FABRICATION

(75) Inventors: Friedrich B. Prinz, Woodside, CA (US); Turgut M. Gür, Palo Alto, CA (US)

(73) Assignee: The Board of Trustees of the Leland Stanford Junior University, Palo Alto, CA (US)

(*) Notice: Subject to any disclaimer, the term of this patent is extended or adjusted under 35 U.S.C. 154(b) by 661 days.

(21) Appl. No.: 12/589,857

(22) Filed: Oct. 28, 2009

(65) Prior Publication Data

US 2010/0112196 A1  May 6, 2010

Related U.S. Application Data

(60) Provisional application No. 61/198,369, filed on Nov. 4, 2008.

(51) Int. Cl.
  *B05D 5/12* (2006.01)
  *H01M 8/10* (2006.01)
  *C25B 9/10* (2006.01)

(52) U.S. Cl.
  CPC ............... *H01M 8/1006* (2013.01); *C25B 9/10* (2013.01); *Y02E 60/521* (2013.01)
  USPC ............................ 427/155; 429/479; 429/483

(58) Field of Classification Search
  USPC .......................................................... 427/115
  See application file for complete search history.

(56) References Cited

U.S. PATENT DOCUMENTS

| | | | |
|---|---|---|---|
| 5,753,385 A | 5/1998 | Jankowski et al. | |
| 6,458,170 B1 | 10/2002 | Visco et al. | |
| 6,605,316 B1 | 8/2003 | Visco et al. | |
| 6,645,656 B1 | 11/2003 | Chen et al. | |
| 6,682,842 B1 | 1/2004 | Visco et al. | |
| 6,740,441 B2 | 5/2004 | Visco et al. | |
| 6,979,511 B2 | 12/2005 | Visco et al. | |
| 2003/0044667 A1* | 3/2003 | Hara et al. ...................... | 429/30 |
| 2003/0104273 A1* | 6/2003 | Lee et al. ....................... | 429/144 |
| 2005/0048343 A1* | 3/2005 | Thirukkvalur ................. | 429/32 |
| 2005/0106436 A1* | 5/2005 | Lazaroff ......................... | 429/32 |
| 2006/0008682 A1* | 1/2006 | McLean et al. ................ | 429/12 |
| 2008/0085439 A1* | 4/2008 | Hilliard .......................... | 429/30 |
| 2009/0087712 A1* | 4/2009 | Huang et al. ................... | 429/30 |

* cited by examiner

*Primary Examiner* — Austin Murata
(74) *Attorney, Agent, or Firm* — Lumen Patent Firm

(57) ABSTRACT

The current invention provides a fabrication method for large surface area, pinhole-free, ultra thin ion conducting membranes using atomic layer deposition on inexpensive sacrificial substrates to make cost effective, high performance fuel cells or electrolyzers. The resultant membrane electrode assembly (MEA) enables significant reduction in resistive losses as well as lowering of the operating temperature of the fuel cell. The invention further provides a method to deposit 3-dimensional surface conformal films that may have compositional grading for superior performance. In addition, the invention provides decoration and modification of electrode surfaces for enhanced catalytic activity and reduced polarization losses. The method of the current invention enables the MEA structure to be fabricated from the anode side up or the cathode side up, each with or without an incorporated anode current collector or cathode current collector, respectively.

19 Claims, 4 Drawing Sheets

THIN FILM MEA STRUCTURES FOR FUEL CELL AND METHOD FOR FABRICATION

CROSS-REFERENCE TO RELATED APPLICATIONS

This application claims priority from U.S. Provisional Patent Application 61/198,369 filed Nov. 4, 2008, which is incorporated herein by reference.

FIELD OF THE INVENTION

The invention relates to fuel cells. More particularly, the invention relates to a method of fabricating flat or 3-dimensional membrane electrode assembly (MEA) structures with ultra thin film ion conducting dense membranes for fuel cells.

BACKGROUND

Fuel cells are electrochemical devices that directly convert the chemical energy of a fuel into electricity, and typically employ an anode where the fuel is oxidized, a cathode where the oxidant is reduced, and an ionically conducting membrane as the electrolyte that selectively transports the electroactive ion only.

To minimize resistive loses through the electrolyte and improve fuel cell performance, it is desirable that the ion transporting membrane is made as thin as possible and does not exhibit concomitant electronic transport either intrinsically or through the presence of pores and pinholes, both of which may give rise to internal shorting. The latter becomes a critical issue especially for thin film fuel cell structures where even nanometer scale pinholes in the electrolyte membrane may give rise to internal electronic shorting between the anode and cathode, and dramatically diminish the performance of the fuel cell.

Although the first fuel cell was demonstrated more than 150 years ago, followed by a significant development effort and investment by NASA in the 1950s in support of the space program, commercialization of fuel cell technologies have been painstakingly slow. Phosphoric acid fuel cell (PAFC) is the only type of fuel cell to date that has been fully commercialized with over 200 units operating around the globe. The other major types of fuel cells, such as polymer exchange membrane (PEMFC), direct methanol (DMFC), solid oxide (SOFC), Alkaline (AFC), and molten carbonate (MCFC), are all at various stages of development and/or commercialization. Besides the difficulty of matching fuel cell performance and operating conditions with strict materials requirements, the prospects for commercialization of fuel cells have also been plagued with high fabrication and manufacturing costs that make it difficult for these otherwise efficient and environmentally friendly technologies compete economically with conventional power generation systems.

Accordingly, there is a need to develop a fabrication method for ultra thin, large surface area, pinhole free ion conducting membranes on inexpensive substrates to make cost effective, high performance fuel cells with reduced resistive losses and a lowered operating temperature.

SUMMARY OF THE INVENTION

The present invention provides a method of fabricating a membrane electrode assembly (MEA) structure that includes providing a sacrificial support layer, wherein said sacrificial support layer comprises a removable material; providing a current collector layer to said sacrificial support layer; depositing a first electrode layer to said current collector layer and to said sacrificial support layer, wherein said electrode layer conforms to features in said current collector layer and to said sacrificial support layer; depositing an electrolyte layer on said first electrode layer; depositing a second electrode layer on said electrolyte layer; and removing said sacrificial support layer from said current collector layer.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Figure 1:
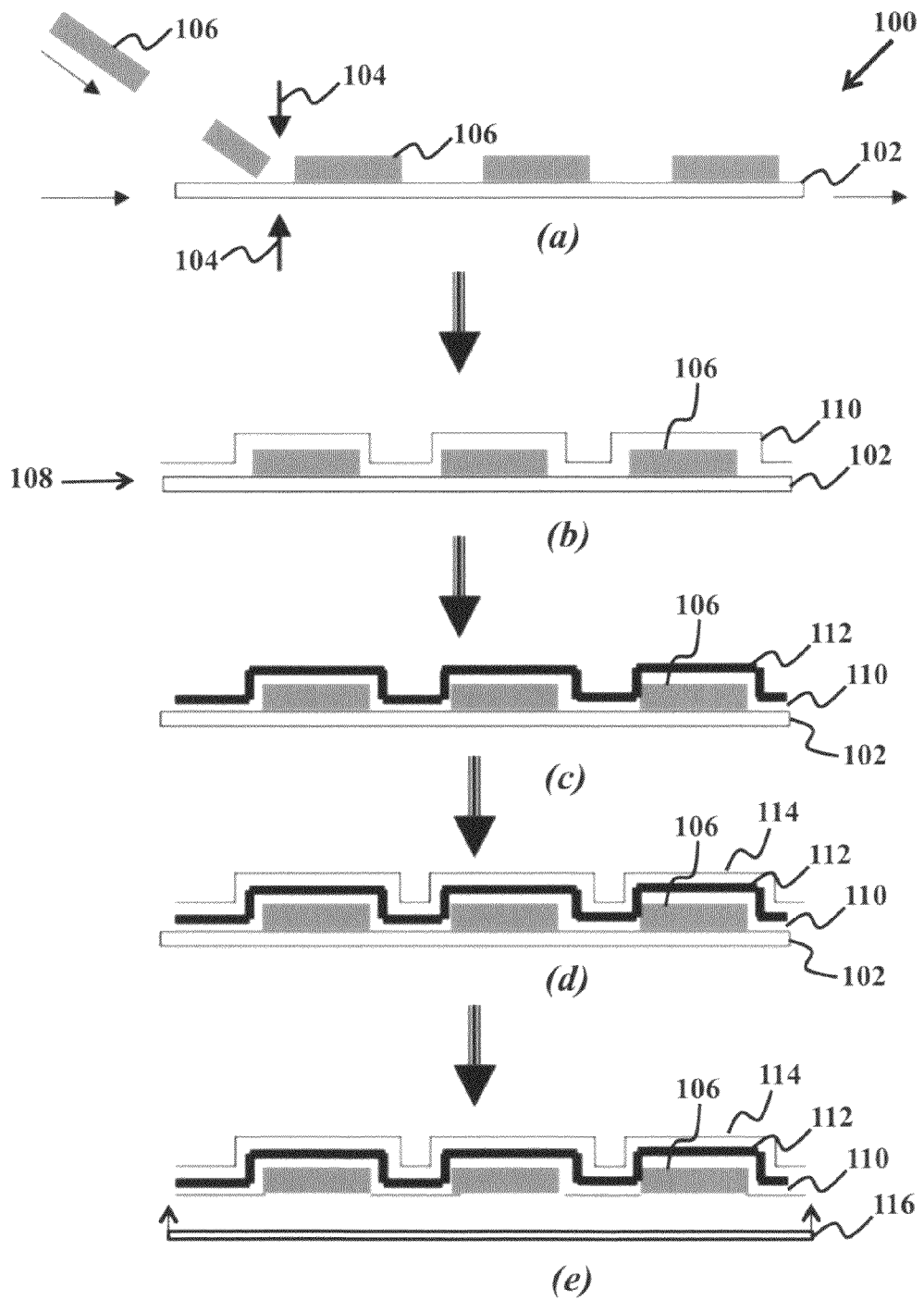
FIGS. 1a-1e show a flow diagram of the steps for fabricating a thin film fuel cell with an electrolyte and a cathode current collection layer, according to one embodiment of the current invention.

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

The current invention provides a fabrication method for ultra thin, large surface area, pinhole free ion conducting membranes on inexpensive substrates to make cost effective, high performance fuel cells. This allows significant reduction in resistive losses as well as lowering of the operating temperature of the fuel cell. The invention further provides a method to deposit 3-dimensional surface conformal films that may have compositional grading for superior performance. In addition, the invention provides decoration and modification of electrode surfaces for enhanced catalytic activity, reducing polarization losses.

The invention provides improved performance membrane electrode assemblies (MEAs) for fuel cells and electrolyzers that, for example, dissociate hydrogen from water. One aspect of the invention includes deposition of ultra thin ion conducting dense electrolyte membranes that do not contain pinholes. In another aspect, the invention introduces a surface-conformable thin film deposition technique such as atomic layer deposition (ALD) that has the capability of coating flat and vertical surface features and other surface contours entirely and uniformly in all three dimensions. In a further aspect, the invention introduces a cost effective fabrication process for mass production of large area MEAs. According to one aspect of the invention, provided is the electrolyte/electrode interface at the atomic level by ALD deposition of catalytically active layers that enhance the charge transport rate at this interface. In another aspect, the invention introduces compositional grading in the electrode layers in order to both engineer and tune at the atomic level interfacial coherence, point defect equilibria, and charge transport and catalytic properties of the electrolyte and the electrode layers, or matching of thermal expansion coefficients with the electrolyte membrane. In another aspect, this invention includes depositing the individual layers of the MEAs on inexpensive support structures that serve as current collectors. In a further aspect of this invention, ultra thin fuel cell MEA structures are provided that significantly reduce resistive losses. In yet another aspect of this invention the operating temperatures of ceramic electrolyte fuel cells and electrolyzers are significantly reduced below what is otherwise typical and normal for such systems. In another aspect, the fabrication process or the invention is suitable for all fuel cell systems and electrolyzers that employ either oxide ion or proton conducting membrane electrolytes.

As one of ordinary skill in the art will appreciate, the drawings and description disclosed herein illustrate technologies related to the invention, show examples of the invention, and provide examples of using the invention. Various changes, substitutions, modifications, and alterations could be made or otherwise implemented without departing from the principles of the present invention. Accordingly, the present invention should not be construed as being limited to or defined by what is shown or described herein.

The present invention provides a process for fabrication of thin film all solid-state membrane electrode assemblies (MEA) for fuel cells and electrolyzers. This process offers significant advantages over other thin film and conventional fabrication processes in low fabrication costs and ability for pinhole-free large area mass production of MEAs, coupled with lower operating temperatures and high performance for fuel cells and electrolyzers.

In one embodiment of the invention, shown in FIGS. 1a-1e show a flow diagram 100 of the steps for fabricating a thin film fuel cell with an electrolyte and a cathode current collection layer, according to one embodiment of the current invention, FIG. 1a shows the fabrication method starts with providing a thin sacrificial support material 102 that is suitable for subsequent removal by chemical methods including etching and dissolution, and physical methods including peeling and de-lamination during the later stage of the MEA fabrication process. The sacrificial support material 102 can include inexpensive metals, polymers or metal-coated polymers, for example. In the one embodiment, the support material 102 is a thin aluminum foil, but other thin metal foils such as copper, nickel and zinc can also be employed.

FIG. 1a further shows the bonding 104 of a cathode current collector 106 on to the sacrificial support material 102. The current collector 106 can be a continuous sheet or foil that is pre-stamped or perforated with holes using a fast and cheap mechanical or optical process such as stamping, pressing or laser drilling, or it can be patterned by stamping, rolling, calendaring, laser drilling, lithography, etc. Bonding 104 between the support material 102 and the current collector 106 can be achieved at room or elevated temperatures by using any one of the processes including pressing, rolling, calendaring, laminating, thermal or diffusion bonding, etc. The cathode current collector 106 can include inexpensive materials such as stainless steel and similar oxidation resistant alloys containing Ni and Cr. The current collector 106 can be in the form of screen, mesh, gauze, perforated sheet, etc. The non-planar form or pattern of the current collector 106 serves two purposes. First is to serve as current collector, of course. The second, but equally important, is to increase the effective surface area of the support structure 102 above and beyond its projected geometric area. When the MEA fabrication process reaches completion, this increased effective area eventually translates into increased electrolyte/electrode interface area for higher performance per unit projected geometric area of the MEA. This non-planar cathode current collector 106 and the sacrificial support material 102, such as Al foil under-support, constitute the scaffolding structure 108 for the MEA.

FIG. 1b shows deposition of a suitable cathode material 110 on top of the non-planar cathode current collector 106 and the sacrificial support material 102, forming a scaffolding structure 108. The thickness of the cathode layer 110 may be between 10 and 100 nm, and it can be deposited by ALD. The interface between the cathode 110 and the electrolyte 112 shown in FIG. 1c may be engineered at the atomic scale using ALD to enhance the charge transfer reaction at this interface by incorporating catalytically active ingredients to the electrode such as doped-$CeO_2$, Pt, Pd, Ru, Ag, Ni, and their mixtures and alloys, and oxides of Ru, Ir, Rh, and Re.

FIG. 1c shows the coating of the top of the scaffolding structure 108 with an ultra thin film of ionically conducting electrolyte 112 to obtain a uniform, pinhole-free layer. The electrolyte film 112 can between 10 and 1000 nm thick, but preferably 100-300 nm. Since the scaffolding structure 108 has three-dimensional features including vertical surfaces, the deposited electrolyte layer 112 and the resulting electrolyte/electrode interfaces on either side have non-planar surfaces that significantly increase their effective surface areas above and beyond their geometric projections. It is important that the technique for this non-planar deposition is not selected from one of the physical vapor coating processes such as sputtering, evaporation, pulsed laser deposition (PLD) etc, that are all limited by line-of-sight coverage. Instead, atomic layer deposition (ALD) is the preferred coating process for surface-conformal coverage in three dimensions, although other forms of chemical vapor deposition methods may also be suitable for this purpose. ALD is not only capable of coating all surface contours and features in a uniform manner, but it is also capable of non-planar coating of large area ultra thin membrane films that are free of pinholes. The latter is of special importance since electrodes may internally short the ultra thin membranes through pinholes, and diminish the performance of the fuel cell or the electrolyzer.

FIG. 1d shows the deposition of a suitable anode material 114 on top of the ultra thin electrolyte membrane 112. The thickness of the anode layer 114 may be between 10 and 100 nm, and it can be deposited by ALD. The interface between the anode 114 and the electrolyte 112 may be engineered at the atomic scale using ALD to enhance the charge transfer reaction at this interface by incorporating catalytically active ingredients to the electrode such as doped-$CeO_2$, Pt, Pd, Ru, Ag, Ni, and their mixtures and alloys, and oxides of Ru, Ir, Rh, and Re. ALD also allows compositional grading of the anode layer 114 in order to tailor catalytic properties and match the thermal expansion coefficient of the electrolyte 112.

FIG. 1e shows the step of the removal of the sacrificial support material 102 from the current collector 106. In the case of Al foil, this can easily be achieved by dissolving it in alkaline solution. Other kinds of sacrificial support materials 102 can similarly be removed by the use of an appropriate etching solution or a solvent.

FIG. 1e further shows an optional step in which any exposed under-surfaces of the electrolyte membrane 112, the cathode electrode 110 and the current collector 106 are coated by an electrode material 116, for example a cathode material using ALD. Depending upon need, the same kinds of provisions described for the anode, i.e., interface engineering for reactivity and compositional grading for thermal matching, may also be applied for the cathode layer.

Figure 2:
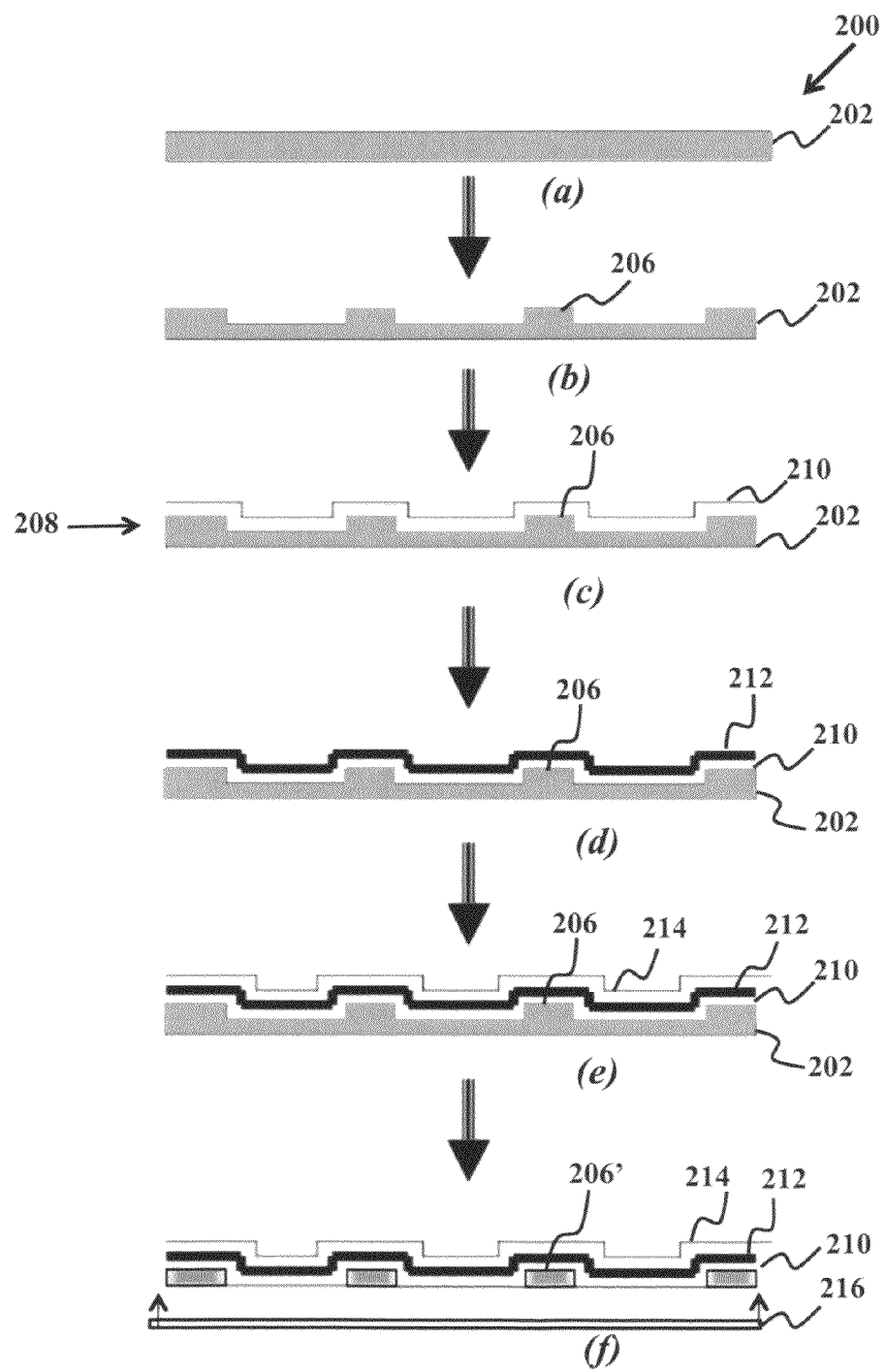
FIGS. 2a-2f show a flow diagram of the steps for fabricating a thin film fuel cell with an electrolyte from the cathode up, according to one embodiment of the current invention.

FIGS. 2a-2f show a flow diagram of the steps for fabricating a thin film fuel cell with an electrolyte from the cathode up 200, according to one embodiment of the current invention. As shown in FIG. 2a, the process starts again with a conductive sacrificial support material 202 made of metal, polymer or a metal-coated polymer that is relatively inexpensive and suitable for subsequent removal by chemical methods including etching or dissolution, and physical methods including peeling or de-lamination during the later stage of the MEA fabrication process. FIG. 2b shows the support material 202 in the current embodiment being further provided with a pattern of features 204, where the support material 202 can be a continuous sheet or foil that is pre-stamped or perforated with holes using a fast and cheap mechanical or optical process such as stamping, pressing or laser drilling, or it can be patterned by stamping, rolling, calendaring, laser drilling, lithography, etc. But none of the holes or other geometric patterns 204 traverses the full thickness of the metal support sheet or foil. The purpose of patterning 204 is to increase the effective surface area of the support structure 202 above and beyond its projected geometric area. When the MEA fabrication process reaches completion, this increased effective area eventually translates into increased electrolyte/electrode interface area for higher performance per unit geometric area.

FIG. 2c shows the step of depositing a suitable layer of cathode material 210 on top of the patterned 204 sacrificial support material 202. The thickness of the cathode layer 210 may be between 10 and 100 nm, and it can be deposited by ALD. The interface between the cathode and the electrolyte may be engineered at the atomic scale using ALD to enhance the charge transfer reaction at this interface by incorporating catalytically active ingredients to the electrode such as doped-$CeO_2$, Pt, Pd, Ru, Ag, Ni, and their mixtures and alloys, and oxides of Ru, Ir, Rh, and Re.

FIG. 2d shows the step of coating the top of the support structure with an ultra thin film of ionically conducting electrolyte 212 to obtain a uniform, pinhole-free layer. The electrolyte film layer 212 can be between 10 and 1000 nm thick, but preferably 100-300 nm. Since the scaffolding structure 208 has three-dimensional features including vertical surfaces, the deposited electrolyte layer 212 and the resulting electrolyte/electrode interfaces on either side have non-planar surfaces that significantly increase their effective surface areas above and beyond their geometric projections. It is important that the technique for this non-planar deposition is not selected from one of the physical vapor coating processes such as sputtering, evaporation, pulsed laser deposition (PLD) etc, that are all limited by line-of-sight coverage. Instead, atomic layer deposition (ALD) is the preferred coating process for surface-conformal coverage in three-dimensions, although other forms of chemical vapor deposition methods may also be suitable for this purpose. ALD is not only capable of coating all surface contours and features in a uniform manner, but it is also capable of non-planar coating of large area ultra thin films that are free of pinholes. The latter is of special importance since electrodes may internally short the ultra thin membranes through pinholes, and diminish the performance of the fuel cell or the electrolyzer.

FIG. 2e shows the step of depositing a suitable anode material layer 214 on top of the ultra thin electrolyte membrane 212. The thickness of the anode layer 214 may be between 10 and 100 nm, and it can be deposited by ALD. The interface between the anode 214 and the electrolyte 212 may be engineered at the atomic scale using ALD to enhance the charge transfer reaction at this interface by incorporating catalytically active ingredients to the electrode such as doped-$CeO_2$, Pt, Pd, Ru, Ag, Ni, and their mixtures and alloys, and oxides of Ru, Ir, Rh, and Re. ALD also allows compositional grading of the anode layer 214 in order to tailor interfacial coherence, point defect equilibria, and charge transport and catalytic properties of the electrolyte 212 and the electrode layers (210/214), and match the thermal expansion coefficient of the electrolyte 212.

FIG. 2f shows the step of removing the sacrificial support material 202 from the cathode current collector 206', where the cathode current collector 206' is the raised portion of the pattern of features 204. It is important to note that the step of removing the support material 202 can include the removal of all of the support material 202, where the current collector 206' is also removed, as indicated in the drawings with the designation of the optionally removable current collector 206', according to the current invention. In the case of Al foil, these removal steps can easily be achieved by dissolving it in alkaline solution. Other kinds of sacrificial support materials can similarly be removed by the use of an appropriate etching solution or a solvent.

Again, as discussed in FIG. 1e above, any exposed under-surfaces of the electrolyte membrane 212 is coated by the cathode material 216 using ALD. Depending upon need, the same kinds of provisions described for the anode, i.e., interface engineering for reactivity and compositional grading for thermal matching, may also be applied for the cathode layer. It is important to note that the two processes described above in FIGS. 1a-1e, and FIGS. 2a-2f, respectively, involve building the MEA structure from the cathode side up. These processes can readily be adapted to equivalent processes that start building the MEA structure from the anode side. The process steps for the latter are shown in FIGS. 3a-3e and FIGS. 4a-4f respectively.

Figure 3:
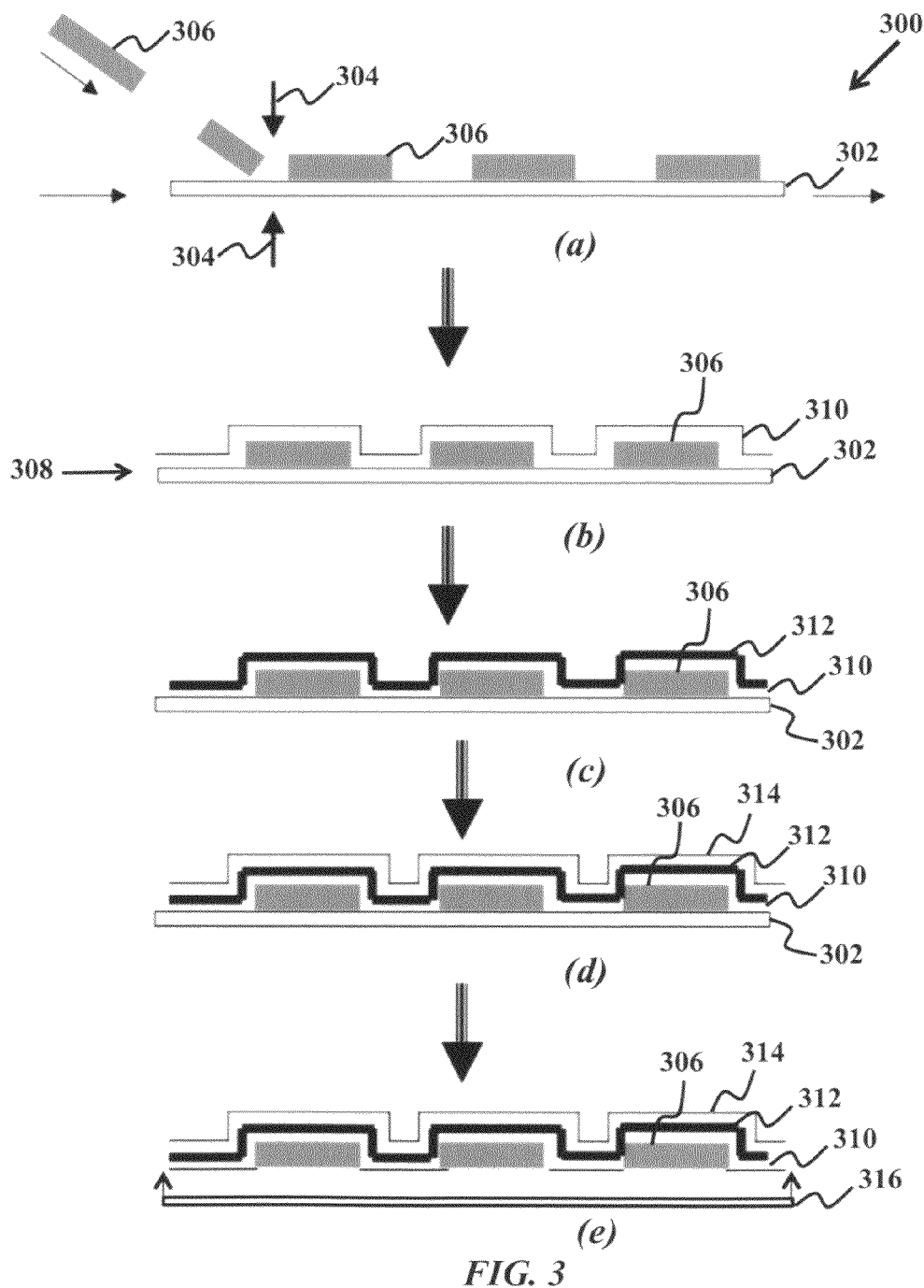
FIGS. 3a-3e show a flow diagram of the steps for fabricating a thin film fuel cell with an electrolyte and an anode current collection layer, according to one embodiment of the current invention.

FIGS. 3a-3e show a flow diagram of the steps for fabricating a thin film fuel cell with an electrolyte and an anode current collection layer 300, according to one embodiment of the current invention. As shown in FIG. 3a a thin sacrificial support material 302 is provided that is suitable for subsequent removal by chemical methods including etching or dissolution, and physical methods including peeling or de-lamination during the later stage of the MEA fabrication process. The sacrificial support material 302 may be selected from a group of inexpensive metals, polymers or metal-coated polymers. In the preferred embodiment, the support material is a thin aluminum foil, but other thin metal foils such as copper, nickel and zinc can also be employed.

FIG. 3b shows bonding 304 of an anode current collector 306 on to the sacrificial support material 302. The current collector 306 can be a continuous sheet or foil that is pre-stamped or perforated with holes using a fast and cheap mechanical or optical process such as stamping, pressing or laser drilling, or it can be patterned by stamping, rolling, calendaring, laser drilling, lithography, etc. Bonding 304 between the support material 302 and the current collector 306 can be achieved at room or elevated temperatures by using any one of the processes including pressing, rolling, calendaring, laminating, thermal or diffusion bonding, etc. The anode current collector 306 can be selected from inexpensive materials such as nickel or iron that have also good catalytic activity. The anode current collector 306 can be in the form of screen, mesh, gauze, perforated sheet, etc. The non-planar form or pattern of the current collector 306 serves two purposes. First is to serve as current collector, of course.

The second, but equally important, is to increase the effective surface area of the support structure above and beyond its projected geometric area. When the MEA fabrication process reaches completion, this increased effective area eventually translates into increased electrolyte/electrode interface area for higher performance per unit projected geometric area of the MEA. This non-planar anode current collector 306 and the sacrificial support material 302, such as Al foil under-support, constitute the scaffolding structure for the MEA.

FIG. 3c shows deposition of a suitable anode material 310 on top of non-planar anode current collector 306 and the sacrificial support material 302, forming a scaffolding structure 308. The thickness of the anode layer 310 may be between 10 and 100 nm, and it can be deposited by ALD. The interface between the anode 310 and the electrolyte layer 312 (FIG. 3d) may be engineered at the atomic scale using ALD to enhance the charge transfer reaction at this interface by incorporating catalytically active ingredients such as doped-$CeO_2$, Pt, Pd, Ru, and Ni. ALD also allows compositional grading of the anode layer 310 in order to tailor and match the thermal expansion coefficient of the electrolyte.

FIG. 3d shows coating the top of the scaffolding structure 308 with an ultra thin film of ionically conducting electrolyte 312 to obtain a uniform, pinhole-free layer. The electrolyte film 312 can be between 10 and 1000 nm thick, but preferably 100-300 nm. Since the scaffolding structure 308 has three-dimensional features including vertical surfaces, the deposited electrolyte layer 312 and the resulting electrolyte/electrode (310/312) interfaces on either side have non-planar surfaces that significantly increase their effective surface areas above and beyond their geometric projections. It is important that the technique for this non-planar deposition is not selected from one of the physical vapor coating processes such as sputtering, evaporation, pulsed laser deposition (PLD) etc, that are all limited by line-of-sight coverage. Instead, atomic layer deposition (ALD) is the preferred coating process for surface-conformal coverage in three dimensions, although other forms of chemical vapor deposition methods may also be suitable for this purpose. ALD is not only capable of coating all surface contours and features in a uniform manner, but it is also capable of non-planar coating of large area ultra thin films that are free of pinholes. The latter is of special importance since electrodes may internally short the ultra thin membranes through pinholes, and diminish the performance of the fuel cell or the electrolyzer. The interface between the anode 310 and the electrolyte 312 may be engineered at the atomic scale using ALD to enhance the charge transfer reaction at this interface by incorporating catalytically active ingredients to the electrode such as doped-$CeO_2$, Pt, Pd, Ru, Ag, Ni, and their mixtures and alloys, and oxides of Ru, Ir, Rh, and Re. ALD also allows compositional grading of the anode layer in order to tailor and match the thermal expansion coefficient of the electrolyte.

FIG. 3e shows deposition of a suitable cathode material 314 on top of the ultra thin electrolyte membrane 312. The thickness of the cathode layer 314 may be between 10 and 100 nm, and it can be deposited by ALD. The interface between the cathode 314 and the electrolyte 312 may be engineered at the atomic scale using ALD to enhance the charge transfer reaction at this interface by incorporating catalytically active ingredients to the electrode such as doped-$CeO_2$, Pt, Pd, Ru, Ag, Ni, and their mixtures and alloys, and oxides of Ru, Ir, Rh, and Re.

FIG. 3f shows the removal of the sacrificial support material 302 from the anode current collector 306. In the case of Al foil, this can easily be achieved by dissolving it in alkaline solution. Other kinds of sacrificial support materials can similarly be removed by the use of an appropriate etching solution or a solvent.

FIG. 3e further shows an optional step in which any exposed under-surfaces of the electrolyte layer 312, the anode electrode 310 and the current collector 306 are coated by the anode material 316 using ALD. Depending upon need, the same kinds of provisions described above in Step 5, i.e., interface engineering for reactivity and compositional grading for thermal matching, may also be applied for the anode layer.

Figure 4:
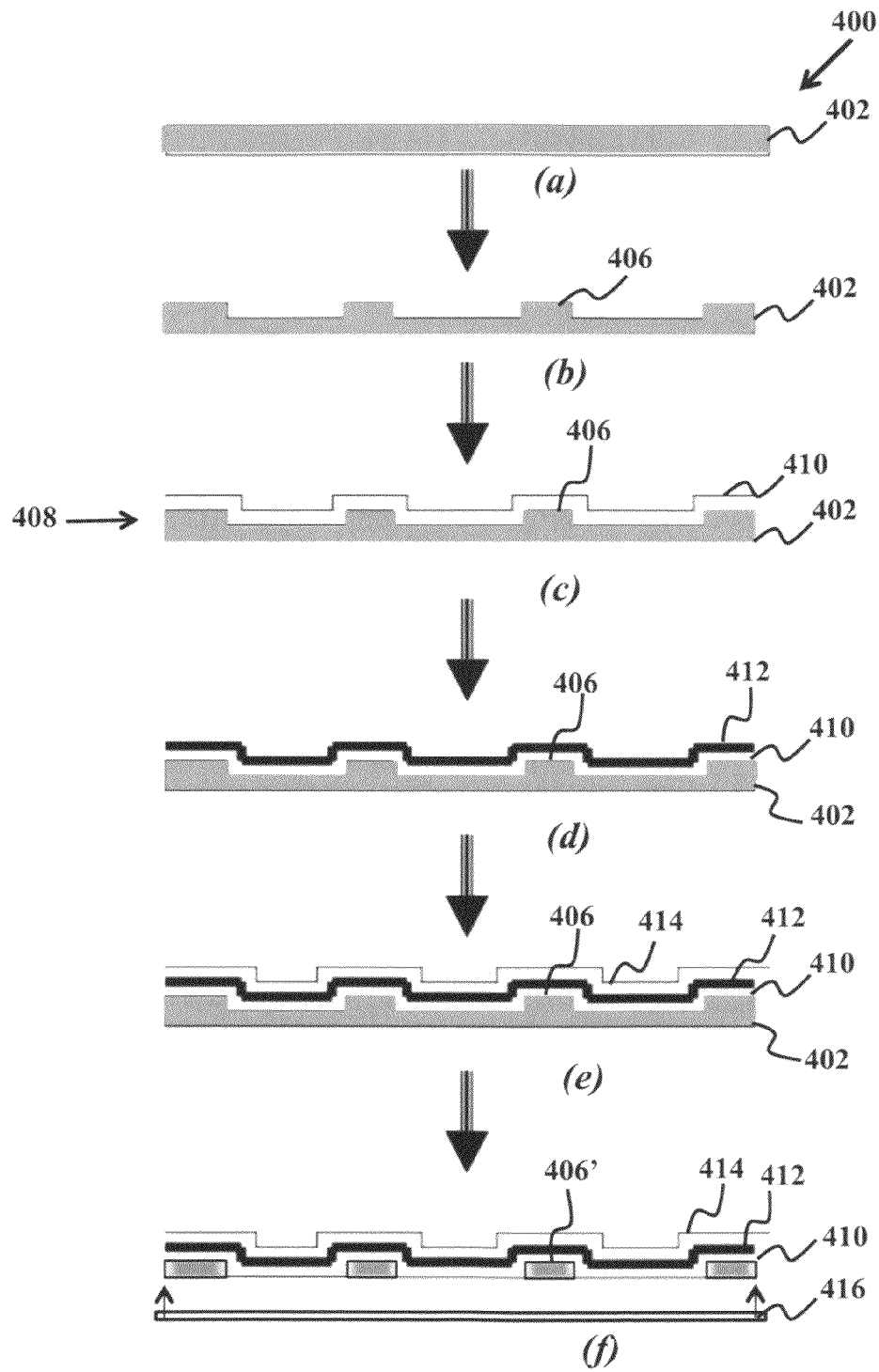
FIGS. 4a-4f show a flow diagram of the steps for fabricating a thin film fuel cell with an electrolyte from the anode up, according to one embodiment of the current invention.

FIGS. 4a-4f show a flow diagram of the steps for fabricating a thin film fuel cell with an electrolyte from the anode up 400, according to one embodiment of the current invention. As shown in FIG. 4a, the process starts again with a conductive sacrificial support material 402 made of metal, polymer or a metal-coated polymer that is relatively inexpensive and suitable for subsequent removal by chemical methods including etching or dissolution, and physical methods including peeling or de-lamination during the later stage of the MEA fabrication process. FIG. 4b shows the support material 402 in the current embodiment being further provided with a pattern of features 404, where the support material 402 can be a continuous sheet or foil that is pre-stamped or perforated with holes using a fast and cheap mechanical or optical process such as stamping, pressing or laser drilling, or it can be patterned by stamping, rolling, calendaring, laser drilling, lithography, etc. But none of the holes or other geometric patterns 404 traverses the full thickness of the metal support sheet or foil. The purpose of patterning 404 is to increase the effective surface area of the support structure 402 above and beyond its projected geometric area. When the MEA fabrication process reaches completion, this increased effective area eventually translates into increased electrolyte/electrode interface area for higher performance per unit geometric area.

FIG. 4c shows the step of depositing a suitable layer of anode material 410 on top of the patterned 404 sacrificial support material 402. The thickness of the anode layer 410 may be between 10 and 100 nm, and it can be deposited by ALD. The interface between the cathode and the electrolyte may be engineered at the atomic scale using ALD to enhance the charge transfer reaction at this interface by incorporating catalytically active ingredients to the electrode such as doped-$CeO_2$, Pt, Pd, Ru, Ag, Ni, and their mixtures and alloys, and oxides of Ru, Ir, Rh, and Re. ALD also allows compositional grading of the anode layer 410 in order to tailor and match the thermal expansion coefficient of the electrolyte 412.

FIG. 4d shows the step of coating the top of the support structure with an ultra thin film of ionically conducting electrolyte 412 to obtain a uniform, pinhole-free layer. The electrolyte film layer 412 can be between 10 and 1000 nm thick, but preferably 100-300 nm. Since the scaffolding structure 408 has three-dimensional features including vertical surfaces, the deposited electrolyte layer 412 and the resulting electrolyte/electrode interfaces on either side have non-planar surfaces that significantly increase their effective surface areas above and beyond their geometric projections. It is important that the technique for this non-planar deposition is not selected from one of the physical vapor coating processes such as sputtering, evaporation, pulsed laser deposition (PLD) etc, that are all limited by line-of-sight coverage. Instead, atomic layer deposition (ALD) is the preferred coating process for surface-conformal coverage in three-dimensions, although other forms of chemical vapor deposition methods may also be suitable for this purpose. ALD is not only capable of coating all surface contours and features in a uniform manner, but it is also capable of non-planar coating of large area ultra thin films that are free of pinholes. The latter is of special importance since electrodes may internally short the ultra thin membranes through pinholes, and diminish the performance of the fuel cell or the electrolyzer.

FIG. 4e shows the step of depositing a suitable cathode material layer 414 on top of the ultra thin electrolyte membrane 412. The thickness of the cathode layer 414 may be between 10 and 100 nm, and it can be deposited by ALD. The interface between the cathode 414 and the electrolyte 212 may be engineered at the atomic scale using ALD to enhance the charge transfer reaction at this interface by incorporating catalytically active ingredients such as doped-$CeO_2$, Pt, Ag, and oxides of Ru, Ir, Rh, and Re. ALD also allows compositional grading of the cathode layer 414 in order to tailor and match the thermal expansion coefficient of the electrolyte 412.

FIG. 4f shows the step of removing the sacrificial support material 402 from the anode current collector 406', where the anode current collector 406' is the raised portion of the pattern of features 404. It is important to note that the step of removing the support material 402 can include the removal of all of the support material 402, where the current collector 406' is also removed, as indicated in the drawings with the designation of the optionally removable current collector 406', according to the current invention. In the case of Al foil, these removal steps can easily be achieved by dissolving it in alkaline solution. Other kinds of sacrificial support materials can similarly be removed by the use of an appropriate etching solution or a solvent.

Similarly, as discussed in FIG. 1e above, any exposed under-surfaces of the electrolyte membrane 412 is coated by the anode material 416 using ALD. Depending upon need, the same kinds of provisions described for the cathode, i.e., interface engineering for reactivity and compositional grading for thermal matching, may also be applied for the anode layer 210.

The present invention has many advantages. For example, the inventions provides the ability for mass production of large surface area MEAs, and pinhole-free ultra thin film deposition of electrolyte. Further, the invention provides the ability to atomically engineer and modify the electrode/electrolyte interface for increased transport and performance. The invention provides the ability for compositional tuning and grading of electrodes to match thermal expansion coefficient and enhance performance factors. The current invention allows the use of lower cost materials, reduced ohmic losses due to ultra thin film structure, and lower operating temperatures for the fuel cell or the electrolyzer, in addition to the ability to operate over a wide temperature window (RT to 800° C.) with minimal resistive losses and fuel flexibility and tolerance. Further, the invention enables effective interface doping, decoration, and compositional tuning strategies to enhance transport and reaction rates, thermal expansion matching and performance and high volumetric power density.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example other anhydrous proton conducting solids such as perovskites, layered oxides like hydronium beta- and beta-aluminas, hydrated solid proton conductors like clays, heteropoly acids, and hydrous oxides. Moreover, other zeolite-like structures, mica, alumina silicates, mixed proton-conducting hydrides or oxyhydrides may be employed for catalytic anode.

All such variations are considered to be within the scope and spirit of the present invention as defined by the following claims and their legal equivalents.

What is claimed is:

1. A method of fabricating a membrane electrode assembly (MEA) structure comprising:
  a. providing a sacrificial support layer, wherein said sacrificial support layer comprises a removable material;
  b. bonding a continuous non-planar current collector sheet or foil to said sacrificial support layer, wherein said continuous non-planar current collector sheet or foil comprises through-hole features with vertical walls;
  c. using atomic layer deposition (ALD) to deposit a first 3-dimensional non-planar conformal electrode layer (first electrode layer) to said continuous non-planar current collector sheet or foil and to said sacrificial support layer, wherein said first electrode layer uniformly and conformally coats the top surface of said continuous non-planar current collector and the vertical walls of said through-hole features in said continuous non-planer current collector sheet or foil and an exposed surface of said sacrificial support layer;
  d. using said (ALD) to deposit a pinhole-free non-planar electrolyte layer on said first electrode layer, wherein said pinhole-free non-planar electrolyte layer uniformly and conformally coats the vertical walls and top surface of said first electrode layer to form a 3-dimensional non-planar pinhole-free electrolyte layer;
  e. using said (ALD) to deposit a second 3-dimensional non-planar conformal electrode layer (second electrode layer) on said 3-dimensional non-planar pinhole-free electrolyte layer, wherein said second electrode layer uniformly and conformally coats the vertical walls and top surface of said 3-dimensional non-planar pinhole-free electrolyte layer; and
  f. removing, using an appropriate solution process, said sacrificial support layer from said continuous non-planar current collector sheet or foil;
  wherein after forming the MEA, depositing a third planar electrode layer contacting an underside of the continuous non-planar current collector sheet or foil and the first electrode, and said continuous non-planar current collector sheet or foil is enveloped in said electrode layer and said third electrode layer.

2. The method of claim 1, wherein said first electrode layer and said third electrode layer are cathode layers and said second electrode layer is an anode layer.

3. The method of claim 1, wherein said first electrode layer and said third electrode layer are anode layers and said second electrode layer is a cathode layer.

4. The method of claim 1, wherein said sacrificial support layer is removed, using said appropriate solution process, comprises chemical etching, or dissolution.

5. The method of claim 1, wherein said sacrificial support layer is selected from the group consisting of metals, polymers and metal-coated polymers, and thin metal foils.

6. The method of claim 1, wherein said continuous non-planar current collector sheet or foil comprises a continuous sheet of material, wherein said through-hole features are formed according to the method selected from a group consisting of stamping, pressing, laser drilling, rolling, calendaring, etching, and lithography.

7. The method of claim 1, wherein said bonding said continuous non-planar current collector sheet or foil to said sacrificial support layer occurs in a temperature range of 25-1250 degrees Celsius.

8. The method of claim 1, wherein said bonding said continuous non-planar current collector sheet or foil to said sacrificial support layer comprises using methods selected from a group consisting of pressing, rolling, calendaring, laminating, thermal and diffusion bonding.

9. The method of claim 1, wherein said continuous non-planar current collector sheet or foil is a continuous cathode current collector sheet or foil made from a material selected from a group consisting of stainless steel and oxidation resistant alloys containing Ni and Cr.

10. The method of claim 1, wherein said continuous non-planar current collector sheet or foil is a continuous anode current collector sheet or foil made from a material selected from a group consisting of stainless steel and oxidation resistant alloys containing Ni, and Fe.

11. The method of claim 1, wherein said continuous non-planar current collector sheet or foil has a shape formed by a method selected from the group consisting of screening, meshing, gauzing, stamping and drilling.

12. The method of claim 1, wherein said 3-dimensional non-planer pinhole-free electrolyte layer has a thickness in a range of 10-1000 nm.

13. The method of claim 1, wherein said second electrode layer has a thickness in a range of 10-100 nm.

14. The method of claim 1, wherein said first and second electrode layers are deposited by atomic layer deposition.

15. The method of claim 1, wherein said first and second electrode layers comprise catalytically active ingredients selected from the group consisting of doped-$CeO_2$, Pt, Pd, Ru, and Ni.

16. The method of claim 1, wherein said second electrode layer comprises a compositional grading, wherein a thermal expansion coefficient of said second electrode layer is matched to a thermal expansion coefficient of said 3-dimensional non-planar pinhole-free electrolyte layer.

17. The method of claim 1, wherein said sacrificial sacrificial support layer comprises a pattern on a top surface of said support layer, wherein features of said pattern have a depth that is less than a thickness of said sacrificial support layer.

18. The method of claim 17, wherein said sacrificial support layer comprises a continuous sheet of material, wherein said features are formed according to a method selected from a group consisting of stamping, pressing, laser drilling, rolling, calendaring, etching, and lithography.

19. The method of claim 1, wherein said sacrificial support layer is removed as a final step of said MEA fabrication process, wherein said final step of said MEA fabrication process comprises peeling or de-lamination said sacrificial support layer.

* * * * *